PICTORIAL VIDEO LEVEL INDICATOR
Filed Dec. 18, 1967
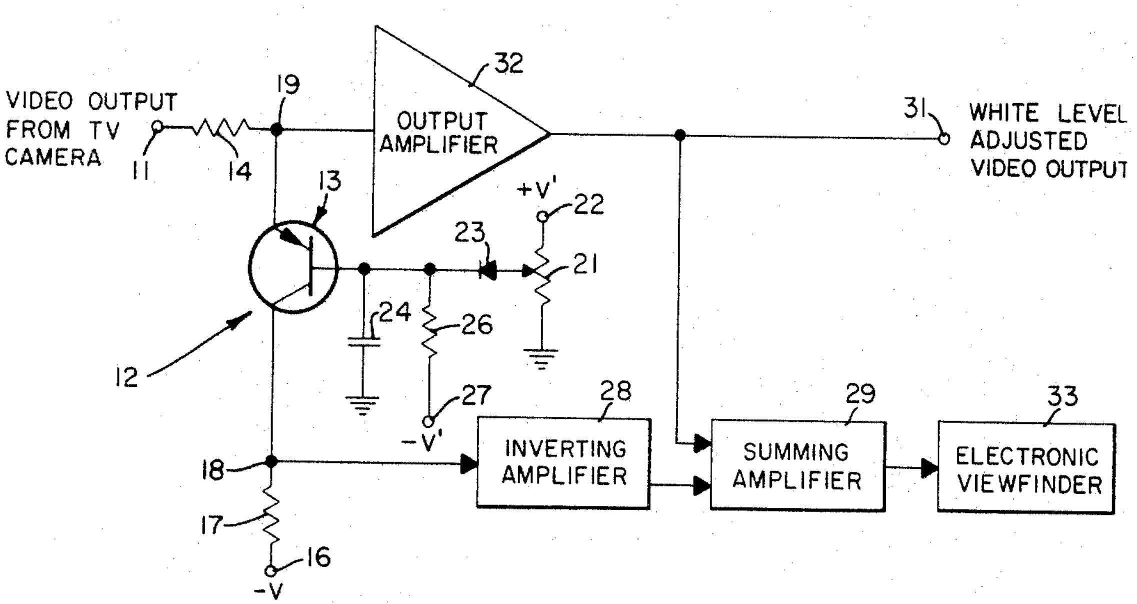
FIG_1
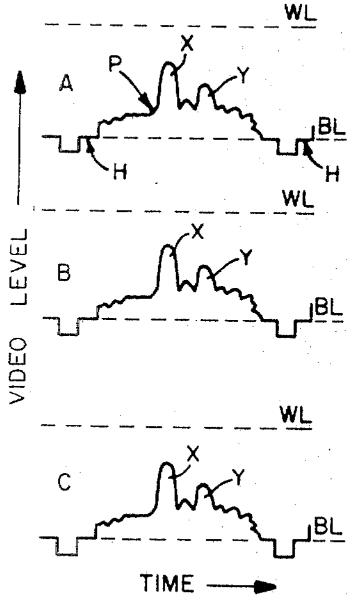
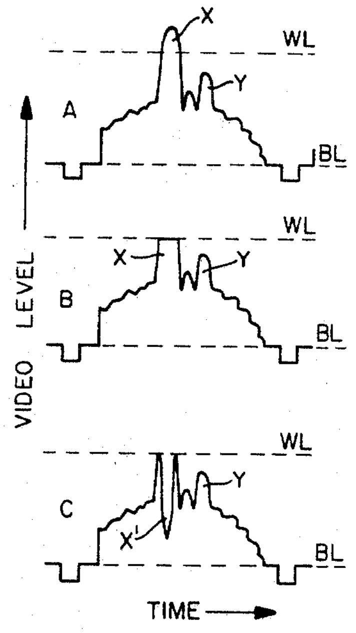
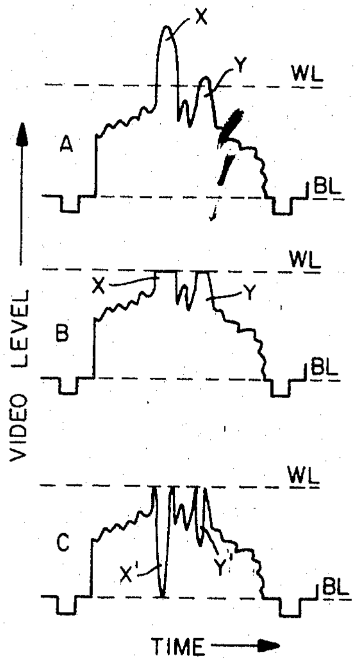
FIG_2 FIG_3 FIG_4
INVENTOR.
EDWIN S. BUSBY JR.
BY Robert G. Clay
ATTORNEY United States Patent Office 3,525,805
Patented Aug. 25, 1970

3,525,805
PICTORIAL VIDEO LEVEL INDICATOR

Edwin S. Busby, Jr., Menlo Park, Calif., assignor to Ampex Corporation, Redwood City, Calif., a corporation of California Filed Dec. 18, 1967, Ser. No. 691,380
Int. Cl. H04n 7/02
U.S. Cl. 178—7.1 9 Claims

ABSTRACT OF THE DISCLOSURE

A system for use with the electronic view-finder, or other scene monitor associated with a television camera, which is effective to incorporate video signal amplitude or level information in the displayed television pictures. The system produces an easily recognized abrupt reversal of the brightness sense of bright objects, as viewed in the viewfinder, whenever they exceed a proper reference level. Such reversal does not disturb the spatial arrangement of picture elements viewed, or otherwise limit the usefulness of the view-finder image. An operator may set a proper video level in accordance with the scene viewed in the viewfinder without shifting his gaze to a separate level display, or interpreting the display. The system is thus particularly useful with a portable camera operated by one person.

BACKGROUND OF THE INVENTION

In the operation of television cameras, it is necessary to focus the camera upon the desired scene and to adjust the iris or aperture setting of the lens, (or otherwise adjust the) intensity (level) of the resulting video signal to a proper level. In order that a proper focus may be ascertained, a monitoring device such as an electronic viewfinder including a kinescope is typically integrally associated with the camera to display the television picture of the viewed image. With relatively large substantially fixed camera installations such as employed in the studio, (another) monitor is also typically remotely located at a central control center. The proper video level has been heretofore ascertained by means of separate equipment, typically a cathode ray tube waveform monitor. The waveform display requires some interpretation in order to determine whether the proper video level is attained. Such an arrangement is particularly disadvantageous in the case of a portable camera operated by one person since the operator must shift his gaze back and forth between the viewfinder and waveform monitor, and also interpret the waveform display. Even if the viewfinder were employed to selectively display the viewed image and the video waveform, the operator could still not simultaneously view the desired scene and ascertain the video level.

SUMMARY OF THE INVENTION

The present invention relates to a pictorial video level indicating system which enables an electronic viewfinder, or other monitor associated with a television camera, to simultaneously display the viewed image and indicate the proper video level of the television picture. More particularly, the system is arranged to introduce into the monitor picture an easily recognized distortion when the video signal level exceeds its proper value, without disturbing the spatial arrangement of the picture elements, or otherwise limiting the usefulness of the monitor image. The distortion is such that as the operator adjusts the video level, bright objects as viewed in the viewfinder or other image monitor abruptly become darker instead of brighter as the proper level is exceeded. Thus, as an extremely important feature of the invention, an operator may continuously view the image displayed on the viewfinder or other monitor while at the same time ascertaining that the proper video level is obtained. No other display such as that appearing on a waveform monitor need be observed or interpreted in order to set the video level to the proper value. Moreover, the system may be utilized with studio camera equipment, or the like, to immediately locate troublesome highlights in a studio scene, etc., in order that the lighting may be corrected.

In the accomplishment of the foregoing, the level indicating system of the present invention basically comprises the relatively simple combination of a white level signal separator for receiving the video signal from a television camera and clipping the signal at a reference white level to separate the signal into white level peak and white level clipped components respectively in excess and not in excess of the reference white level, the white level clipped component being the white level adjusted video signal for transmission to output utilitarian equipment, an inverting amplifier coupled to receive the white level peak component from the signal separator and invert and amplify same, and summing means for additively combining the inverted amplified white level peak component and white level clipped component to thereby provide a composite signal for application to an electronic viewfinder or equivalent image display monitor. Alternative means may of course be employed to provide a composite signal representative of the difference between the white level clipped component and an amplified replica of the white level peak component. The composite signal contains a reversal of brightness sense for video levels in excess of the white level such that the corresponding bright areas of the scene viewed appear dark in the image displayed on the monitor. Consequently, as the video level is increased, a desired highlight of the scene abruptly becomes darker instead of brighter in the displayed image as the white level is exceeded and the proper video level is thereby indicated.

BRIEF DESCRIPTION OF THE DRAWING

FIG. 1 is a block diagram, partially in schematic, of a pictorial video level indicating system in accordance with the present invention.

FIG. 2 is a graphical representation of time correlated signals at several points of the circuit of FIG. 1 for a relatively small camera lens aperture opening.

FIG. 3 is a graphical representation of the corresponding signals of FIG. 2 for a larger aperture opening.

FIG. 4 is a graphical representation of the corresponding signals of FIGS. 2 and 3 for an even larger aperture opening.

DETAILED DESCRIPTION OF THE PREFERRED EMBODIMENT

Referring now to FIG. 1 in detail, a pictorial video level indicating system in accordance with the present invention will be seen to include an input terminal 11 for receiving the video output signal from a television camera. The terminal is connected to a white level signal separator, as generally designated at 12, which is arranged to clip the video signal at a predetermined reference white level and separate the signal into a white level peak component above the level and a white level clipped component below the level. The reference white level is the level of the maximum desired excursion of the video signal in the white direction and corresponds to the normal illumination of the scene being viewed exclusive of undesirable highlights such as may correspond, for example, to directly viewed lights. Thus, the white level peak component comprises the white peaks of the video signal in excess of the reference white level which correspond to the intensely illuminated undesirable highlights of the scene in excess of the desired normal illumination thereof. The white level clipped component comprises the remainder of the video signal, i.e., the original video signal with peaks in excess of the reference white level removed. Such component may thus be termed a white level adjusted video signal wherein the portions corresponding to undesirable highlights in the scene viewed are limited to the reference white level and consequently appear with normal illumination in the television picture.

Although the white level signal separator 12 may be variously provided, same preferably includes a transistor 13 having its emitter-collector path coupled in series with input terminal 11 by means of a resistor 14 and with a forward bias terminal 16 by means of a load resistor 17. The base of the transistor is connected to clipping level establishing means which are effective to normally bias the transistor non-conducting except for signals at the input terminal in excess of the clipping level. Thus, with the clipping level set at the desired reference white level, peaks of the video signal at input terminal 11 in excess of such level render the transistor conducting to clip the peaks therefrom and develop such clipped peaks across resistor 17. The previously mentioned white level peak component and white level clipped component consequently respectively appear at the junctions 18 and 19 of resistors 17 and 14 with the emitter-collector path of the transistor. In the illustrated case transistor 13 is type PNP and the emitter and collector thereof are respectively connected to resistors 14 and 17, while a negative bias, —V, is applied to bias terminal 16. The clipping level establishing means is then preferably provided as a variable resistor 21 connected between a bias terminal 22 and ground, and having a wiper coupled to the base of transistor 13 by means of a diode 23. A decoupling capacitor 24 is connected between the base and ground, and a resistor 26 is connected between the base and a bias terminal 27. For the particular illustrative example, positive and negative biases +V′ and —V′ are respectively applied to terminals 22 and 27, and the positive terminal of diode 22 is connected to the wiper of variable resistor 21 while the negative terminal thereof is connected to the base of the transistor. It will be appreciated that the clipping reference white level may be set as desired by adjustment of the wiper of the variable resistor.

The white level peak component of the video signal appearing at junction 18 is applied to an inverting amplifier 28 wherein the clipped white peaks are inverted and amplified. The inverted and amplified peaks at the output of amplifier 28 are applied to one input of a summing amplifier 29, or equivalent means. The white level clipped component of the video signal appearing at terminal 19 is coupled to a second input of the summing amplifier and to a white level adjusted video output terminal 31, preferably by means of an output amplifier 32. The inverted and amplified white level peak component and white level clipped component are additively combined by the summing amplifier to produce a resultant output signal which is essentially the original video signal, but distorted to the extent that peak portions exceeding the reference white level now cause relatively black levels. In other words, the signal from the summing amplifier contains a reversal of brightness sense for portions in excess of the reference white level.

The summing amplifier output is applied to an electronic viewfiinder 33, or equivalent image display monitor upon which the video signal may be viewed pictorially. The image appearing in the viewfinder thus contains dark areas for intense highlights of the scene being viewed. Upon increasing the intensity of the image transmitted to the camera tube by increasing the lens aperture, the scene illumination, electrical gain of the camera, etc., the level of the video signal is correspondingly increased in the white direction. The highlights in the viewfinder image become darker, and at the time the intensity of a desired highlight traverses the reference white level, the corresponding area of the image abruptly changes from light to dark. It is thus a relatively easy matter to observe when a desired highlight has a video level precisely equal the reference white level, at which time the white level adjusted video output appearing at terminal 31 has the proper video level.

The operation of the pictorial video level indicating system outlined above will be better understood by reference to the exemplary waveforms of FIGS. 2, 3, and 4. In this regard, the sets of waveforms depicted in these respective figures are representative of those which would occur at several corresponding points of the circuit for three camera lens aperture openings of increasing size. The waveforms of FIGS. 2, 3, and 4 might correspond, for example, to *F*/16, *F*/13, and *F*/11 respectively. Portions A of the respective figures depict one line of the television camera video output at terminal 11 for the three aperture openings. The horizontal synchronizing pulses H are shown negative in respect to a reference black level, BL, while the picture information content P of the line increases in intensity in the direction of a reference white level, WL, for the increasing aperture openings depicted in FIGS. 2, 3 and 4. The line includes an undesirable highlight X and desirable highlight Y, and for a proper setting of the video level the desirable highlight Y should correspond to the reference white level, WL. For the aperture opening depicted in FIG. 2 the levels of the undesirable and desirable highlights are below the reference white level, WL. For the aperture opening depicted in FIG. 3 the level of undesirable highlight X exceeds the reference white level, and for the aperture opening depicted in FIG. 4 the level of undesirable highlight Y just exceeds the reference white level.

Portions B of FIGS. 2, 3, and 4 represent the white level clipped components derived from separator 12 for the video signals of portions A, as applied to the summing amplifier 29, and to output terminal 31 as the white level adjusted video output. Portions C depict the corresponding brightness sense reversed outputs of summing amplifier 29 applied to the electronic viewfinder 33, or other image display monitor.

For the aperture opening of FIG. 2, the waveforms depicted in portions B and C are the same as the camera video signal of portion A inasmuch as the undesirable and desirable highlights X and Y do not exceed the reference white level, WL. In other words, no peak component is derived from separator 12, inverted by amplifier 28, and applied to summing amplifier 29. In the image displayed by the viewfinder 33, the undesirable and desirable highlights appear as varied degrees of brightness.

For the increased aperture opening of FIG. 3, the peak of the undesirable highlight X is clipped at the white level WL by separator 12, and the signal of portion A is separated into a peak component corresponding to the peak of highlight X above the white level depicted in portion A and a white level clipped component as depicted in portion B. As previously noted, the peak component is inverted and amplified by amplifier 28 and applied together with the clipped component to summing amplifier 29. In the resulting summation output signal of amplifier 29, depicted in portion C, the highlight X consequently appears as an amplified inverted, or black peak X′. As observed in the viewfinder, the undesirable highlight appears as a dark area. The desirable highlight Y, however, is merely increased in brightness over that for the aperture opening of FIG. 2, since the level of the desirable highlight does not yet exceed the reference white level, WL.

When the aperture opening is further increased to that of FIG. 4, and the peak of the desirable highlight Y just exceeds reference white level, WL, the peak component derived from separator 12 now includes the peak of undesirable highlight X above the reference white level and the peak of desirable highlight Y above the reference white level. In the white level clipped component illustrated in portion B, the relatively large peak of the undesirable highlight X and the relatively small tip of the desirable highlight Y have been clipped and thus limited to the reference white level. In the summation output signal depicted in portion C resulting from combination of the white level clipped component and amplified and inverted peak component, both the undesirable highlight X and desirable highlight Y appear as black peaks X' and Y', the peak Y' being, however, of a substantially lesser black level than the peak X'. As observed in the viewfinder, both highlights appear as relatively dark areas, and it can be precisely ascertained when the desirable highlight is at the reference white level by observing the reversal of brightness sense thereof from light to dark.

I claim:

1. A video level indicating system for a television camera comprising white level signal separator means for receiving a video signal from a television camera and clipping said signal at a predetermined white reference level to separate said signal into white level peak and white level clipped components respectively above and below said reference level, means coupling said white level clipped component to an output terminal, means coupled in receiving relation to said white level clipped component and said white level peak component for subtracting an amplified replica of the peak component from the clipped component to thereby produce a composite signal representative of the difference therebetween, and image display monitor means coupled in receiving relation to said composite signal for displaying the corresponding image thereof.

2. A video level indicating system according to claim 1, further defined by said white level signal separator means comprising a transistor having emitter, base, and collector, means serially coupling a first side of the emitter-collector path of said transistor in receiving relation to said video signal, a load resistor serially coupling the second side of said emitter-collector path to a source of forward bias, and clipping level establishing means coupled to said base of said transistor to normally bias same non-conducting for signals below said predetermined reference white level.

3. A video level indicating system according to claim 1, further defined by said means for subtracting an amplified replica of the peak component from the clipped component comprising an inverting amplifier coupled in receiving relation to said peak component for inverting and amplifying same, and summing means coupled in receiving relation to said clipped component and the inverted and amplified peak component from said inverting amplifier for additively combining same to produce said composite signal.

4. A video level indicating system according to claim 1, further defined by said image display monitor means being an electronic viewfinder.

5. A video level indicating system according to claim 2, further defined by said means for subtracting an amplified replica of the peak component from the clipped component comprising an inverting amplifier coupled to said load resistor for producing an inverted and amplified replica of said peak component, and a summing amplifier coupled to said first side of said emitter-collector path of said transistor and to said inverting amplifier for additively combining said clipped component and said inverted and amplified replica of said peak component to produce said composite signal.

6. In combination with a television camera having an electronic viewfinder for displaying an image of a scene being viewed and an output terminal for providing a video signal corresponding to said scene, a video level indicating system comprising white level signal separator means having an input coupled in receiving relation to the output terminal of said camera and having first and second outputs, said separator means being effective to clip a video signal at said input to a predetermined reference white level and produce white level peak and white level clipped components respectively above and below said reference level at said first and second outputs, a white level adjusted video output terminal coupled to said second output of said separator means, and means coupled to said first and second outputs of said separator means for subtracting an amplified replica of said peak component from said clipped component to produce a composite signal and applying said composite signal to said viewfinder.

7. The combination of claim 6, further defined by said separator means comprising a transistor having emitter, base, and collector, a resistor connecting said emitter to said output terminal of said camera, the junction between said emitter and resistor being said second output, a forward bias terminal, a second resistor connecting said collector to said forward bias terminal, the junction between said collector and second resistor being said first output, and clipping level biasing means coupled to said base of said transistor to establish a clipping bias thereat corresponding to said reference white level.

8. The combination of claim 6, further defined by the subtracting means comprising an inverting amplifier coupled to said first output of said separator means to invert and amplify said peak component therefrom, and a summing amplifier having inputs coupled to said second output of said separator means and to said inverting amplifier and having an output coupled to said viewfinder, said summing amplifier being effective to additively combine the amplified and inverted peak component and said clipped component to thereby produce said composite signal.

9. The combination of claim 7, further defined by the subtracting means comprising an inverting amplifier connected to said first output, and a summing amplifier having inputs connected to said inverting amplifier and to said second output, said summing amplifier having an output connected to said viewfinder.

References Cited

UNITED STATES PATENTS

| | | |
|---|---|---|
| 2,952,738 | 9/1960 | Akins. |
| 3,330,907 | 7/1967 | Ichiro Arimura et al. |
| 3,435,136 | 3/1969 | Bachmann et al. |

ROBERT L. GRIFFIN, Primary Examiner

A. H. EDDLEMAN, Assistant Examiner

U.S. Cl. X.R.

178—6.8